United States Patent [19]

Collins et al.

[11] Patent Number: 5,543,920
[45] Date of Patent: Aug. 6, 1996

[54] SYSTEM AND METHOD FOR SENSING COLOR AND PREVENTING USE OF UNAUTHORIZED COLOR FORMULATION SOFTWARE

[75] Inventors: John B. Collins, Westport, Conn.; Richard J. Knapp, New Paltz, N.Y.

[73] Assignee: Kollmorgen Corporation, Waltham, Mass.

[21] Appl. No.: 401,216

[22] Filed: Mar. 9, 1995

Related U.S. Application Data

[62] Division of Ser. No. 288,576, Aug. 10, 1994.

[51] Int. Cl.$^6$ ........................................................ G01J 3/46
[52] U.S. Cl. ................................................ 356/402; 250/226
[58] Field of Search .......................... 354/402–411, 319, 354/326, 328, 236; 250/226

[56] References Cited

U.S. PATENT DOCUMENTS

| | | | |
|---|---|---|---|
| 3,996,449 | 12/1976 | Attanasio et al. | 340/825.34 X |
| 4,462,076 | 7/1984 | Smith, III. | |
| 4,658,093 | 4/1987 | Hellman. | |
| 4,670,857 | 6/1987 | Rackman. | |
| 4,917,500 | 4/1990 | Lugos | 356/406 |
| 4,968,143 | 11/1990 | Weston | 356/328 |
| 5,155,768 | 10/1992 | Matsuhura. | |
| 5,198,806 | 3/1993 | Lord | 340/825.31 |
| 5,210,795 | 5/1993 | Lipner et al.. | |
| 5,253,295 | 10/1993 | Saada et al.. | |
| 5,357,573 | 10/1994 | Walters. | |

FOREIGN PATENT DOCUMENTS

| | | |
|---|---|---|
| 600660A2 | 6/1994 | European Pat. Off.. |
| 4315732C1 | 6/1994 | Germany. |

*Primary Examiner*—K. Hantis
*Attorney, Agent, or Firm*—Morgan & Finnegan, L.L.P.

[57] ABSTRACT

A system and a method for preventing use of unauthorized software contained at a remote location which is to be used with a device having stored information is disclosed. The device includes firmware having a hash code, and a hash function for operating on an initiation string. The device has a communication interface. A remote storage location has an initiation string. The communication interface of the device and the remote storage location are interconnected for transferring information such as the initiation string between the device and remote storage location. The result of the hash function operation on the initiation string is compared with the hash code. The communication interface is enabled when the result of the hash function operation on the initiation string and hash code contained in the firmware are the same. In the illustrated embodiment, the device is a color sensor having a sensor body. The sensor senses and stores information about the color of a selected object such as on an automobile. A serial port on the sensor body is operatively associated with the color sensor and allows interconnection to a serial port of a remote computer. The remote computer receives stored color information from the sensor. The remote computer generates the initiation string to the sensor. The serial port is enabled when the result of the hash function on the initiation string and hash code are the same.

17 Claims, 2 Drawing Sheets

SYSTEM AND METHOD FOR SENSING COLOR AND PREVENTING USE OF UNAUTHORIZED COLOR FORMULATION SOFTWARE

This is a divisional of co-pending application Ser. No. 08/288,576 filed Aug. 10, 1994.

FIELD OF THE INVENTION

This invention relates to a system and method for preventing use of unauthorized software contained in a remote location and used in combination with a device having firmware such as a color sensor, video game or other device.

BACKGROUND OF THE INVENTION

Much research and development goes into developing firmware in devices such as sensors, which are used in conjunction with remote locations having specifically developed software. For example, the car refinishing business is a large industry that has demanding customers. When a portion of an exterior car surface is refinished or repainted, such as occurs in repair work, every customer wants the new surface to match in color with the rest of the car.

However, matching the color surfaces on car exteriors is becoming significantly more difficult to accomplish, because there are thousands of color shades to choose from, as many as forty thousand. Thus, the amount of information needed to make a precise color match in a bodyshop is becoming very difficult without specialized computer help.

Typically, in the past, a bodyshop specialist relied on his sight to compare different paint colors and surface shades, and applied a final coat accordingly. This is becoming increasingly difficult even for the most skilled tradesman.

One device that has been found beneficial for this problem is a multi-angle spectrophotometer, or color sensor. The sensor is held against a car and senses color from three different viewing angles. Such a sensor is presently sold by Akzo Nobel Coatings International, b.v., presently under the trade designation Automatch(g)ic. This sensor allows bodyshop workers access to spectrophotometric readings. The sensor stores information relating to the sensed color and then transfers that information via a serial port to a remote computer such as a notebook or personal computer, which processes the information through resident color formulation software and by appropriate algorithmic and calculation functions. The result is an accurate measurement of the final color.

The sensor can take and store color readings of up to 120 vehicles before interfacing and transferring the information to the remote computer. The remote computer receives and processes by its resident color formulation software the stored color information to obtain the desired color statistics.

Much research and development went into developing the color sensor and the associated color formulation software. Because of the commercial importance of this development, it is necessary to insure that interface protection exists to prevent any users from using the color sensing unit with unauthorized software that is not proprietary to the sensor and software vendor. This same safeguard should be applicable to further sensor and software developments, and developments with other devices such as video game cartridges.

SUMMARY OF THE INVENTION

In accordance with the system, apparatus and method of the present invention, the system prevents use of unauthorized software contained at a remote location which is to be used with a device having stored information such as a color sensor. The device includes firmware having a hash code, and a hash function for operating on an initiation string. The device has a communication interface. A remote storage location has an initiation string. The communication interface of the device and the remote computer are interconnected for transferring information between the device and the remote storage location.

The result of the hash function operation on the initiation string is compared with the hash code. The communication interface is enabled when the result of the hash function operation on the initiation string and the hash code contained in the firmware are the same.

In the illustrated embodiment the device is a sensor. The color sensor has a sensor body and a color sensing means supported by the body for sensing and storing information about the color of the selected object. A serial port is positioned on the sensor body and operatively associated with the sensor computing means and color sensing means, and interfaces with the serial port of a remote computer. The serial port is enabled and disabled from the sensor computing means based on comparisons of a hash code with the result of an operation of the hash function on an initiation string. The color sensing means comprises a spectrophotometer in one aspect of the invention. The initiation string can comprise further information such as a trademark and company name. The serial ports comprise RS 232 ports.

In one aspect of the invention, if the serial port is enabled, the proprietary information corresponding to the initiation string is displayed by the display of the sensor.

BRIEF DESCRIPTION OF THE DRAWINGS

The foregoing advantages of the present invention will be appreciated more fully from the following description, with references to the accompanying drawings in which.

DETAILED DESCRIPTION OF THE INVENTION

The system, apparatus and method of the present invention are advantageous because the present invention prevents use of unauthorized software, such as color formulation software contained at a remote location, which is to be used in conjunction with a device, such as a color sensor. Most of tile description will proceed with a discussion of the invention used in the embodiment of a sensor; however, the invention is applicable to storage devices such as game cartridges which could have an initiation string.

Figure 1:
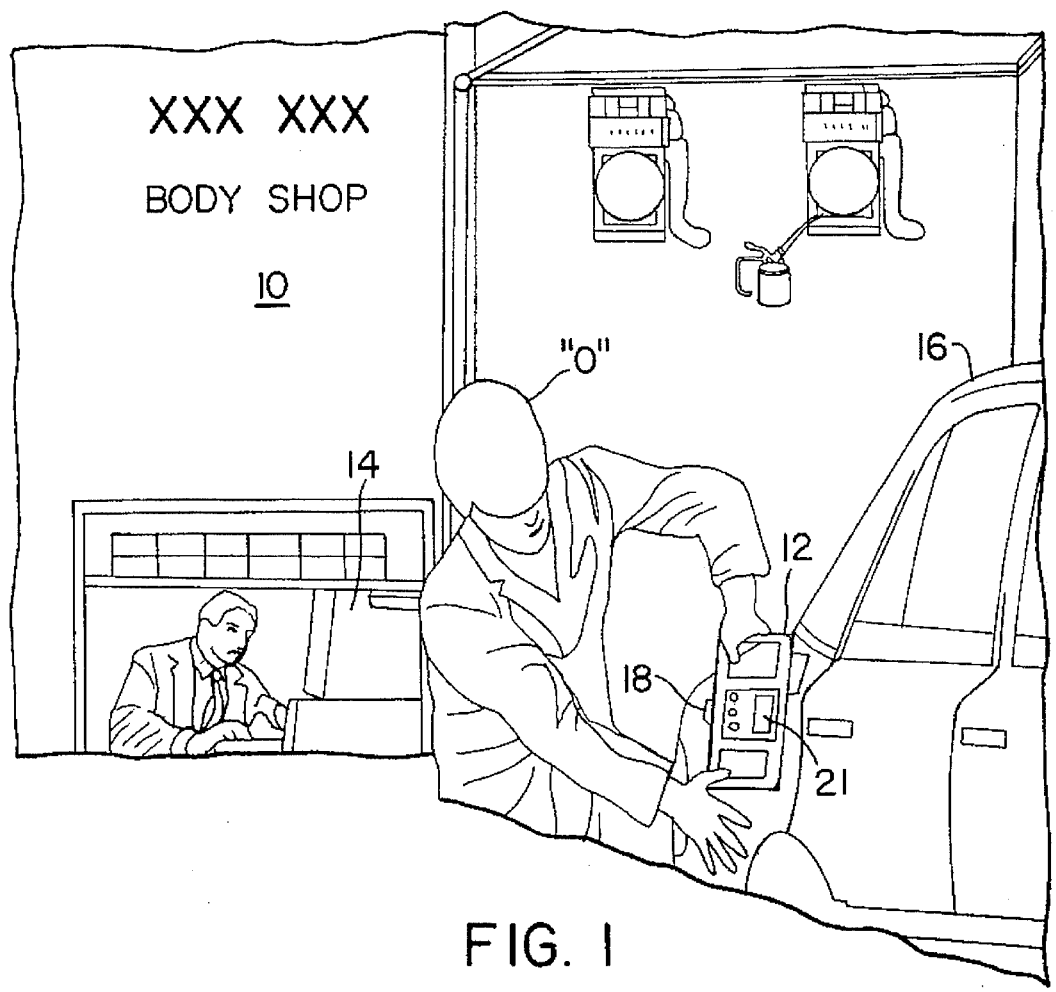
FIG. 1 is environmental view of a color sensor used with an automobile in an automobile repair shop.
Figure 2:
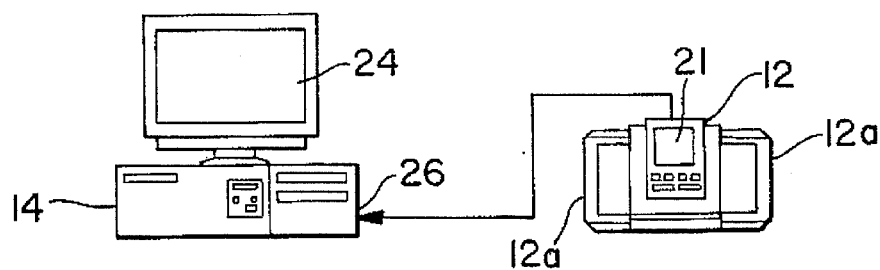
FIG. 2 is a block diagram of the system configuration showing the sensor, RS 232 interface and host PC computer.

Referring now to FIG. 1, there is illustrated a bodyshop 10 where the sensor 12 of the invention is used in conjunction with a remote personal computer 14.

The sensor 12 is a portable gonispectrophotometer, and is used by a bodyshop operator "0" who takes measurements on the illustrated car 16 at typically four different locations in an area which has been refinished after a repair job on the car 16. The sensor 12 will be later connected via an RS 232 serial port 18 to a remote processing unit which in the illustrated embodiment is a personal computer 14.

Figure 3:
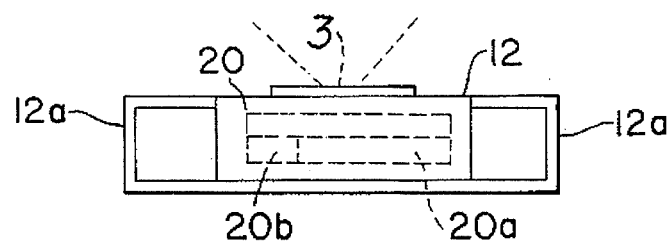
FIG. 3 is a schematic view of the sensor showing various operating components.

The illustrated sensor 12 is a device sold by Akzo Nobel Coatings International, b.v. under the trade designation Automatch(g)ic. The sensor is held with handles 12a against a car to sense color from three different viewing angles (FIGS. 1 and 3). The sensor 12 acts as a spectrometer and photometer which measures directional characteristics of the source and such factors as the illuminous intensity and illuminous flux. More particularly, the sensor is a spectrometer which examines and records information about the light spectrum reflected from the paint finish.

As is well-known to those skilled in the art, radiation from the source is passed through a collimator which produces a parallel beam of radiation. This is dispersed by a prism or diffraction grating. The angular deviation depends on the wavelengths present. The refracted or diffracted radiation is observed and recorded so that the dispersed light can be measured. The sensor includes a processing unit 20 (FIG. 3), which includes firmware 20a, for controlling sensor operation. The firmware includes a plurality of permanent memory locations 20b. The sensor includes a display 21.

In accordance with the present invention, the personal computer 14 includes color formulations software resident therein, a video display 24 and RS 232 serial port 26. Once the sensing has occurred and the information obtained from the sensing function stored in the sensor, the RS 232 serial ports 18, 26 of the computer 14 and sensor 12 are connected to each other.

In accordance with the present invention, a communications protocol is now specified where the color formulations software resident on the personal computer 14 must communicate with the firmware of the sensor. The permanent memory locations 20b of the sensor firmware has embedded hash code as explained below. The firmware also has a hash function. This prevents competitors from using the formulations software in conjunction with the sensor. Access to the sensor is protected by the use of an "initiation string" embedded in a command which enables communication between the personal computer 14 and the sensor 12.

The procedure consists of three parts: 1) serial port initialization command, 2) hash code validation, and 3) display of the initiation string. For purposes of understanding, the following description is explained with reference to the use of the described sensor explained above. The system can be used with any device having firmware such as a video game cartridge.

Serial Port Initiation Command

The command which enables serial port communication with the unit has the following format:

| | |
|---|---|
| [NOTE: The symbols <13> and <10> are the respective representations of carriage return and line feed characters.] | |
| *Product Name (R) Company Name <13> - | Initialization command sent by the host PC. |
| Product Name<13><10> - | Response from the sensor |

Prior to receipt of this command the instrument will ignore any commands sent and simply return 'X'. Once this command has been received and validated, the sensor's communication protocols are enabled. The product name can be a proprietary, registered (R) trademark.

Hash Code Validation

When the firmware receives the above initiation command it compares a hash function of the initiation string (Product Name (R) Company Name) to the hash code stored permanently in the firmware. A "hash" function is an algorithm that scrambles all of the bits of the string and stores selected bits. It is a one-way function having the property that knowledge of the hash code (selected bits) is insufficient to re-generate the initiation string. In the firmware 20a, the initiation string is parsed, and the ASCII value of characters at specific string locations are summed to generate the embedded hash code. If the calculated output of the hash function equals the stored hash code the sensor 12 will be unlocked and serial port communication enabled.

A third party wishing to use the device as part of a system would be obligated to: 1) replace the device firmware with his own firmware; or, 2) disassemble the firmware in order to replace the hash code; or, 3) determine any of many arbitrary strings that have the same hash code as the trademarked string. Clearly, if the hash code comprises "n" bits, there are only 2 raised to the $n^{th}$ power possible hash codes. Thus, one in every $2^n$ strings will have the same hash code as the trademarked string. Failure to take one of these steps by the third party would result in unauthorized use of a protected trademark.

Display of Proprietary Initiation String

Once the sensor has been unlocked, the initiation string is parsed and then displayed on the video display 21 of the sensor 12 in the following format:
PRODUCT NAME®
A PRODUCT OF
COMPANY NAME
The logo screen is displayed each time the unit is powered on. As can be seen in this illustrated embodiment, the proprietary product name is displayed at the top of the logo screen with the proprietary company name.

Figure 4:
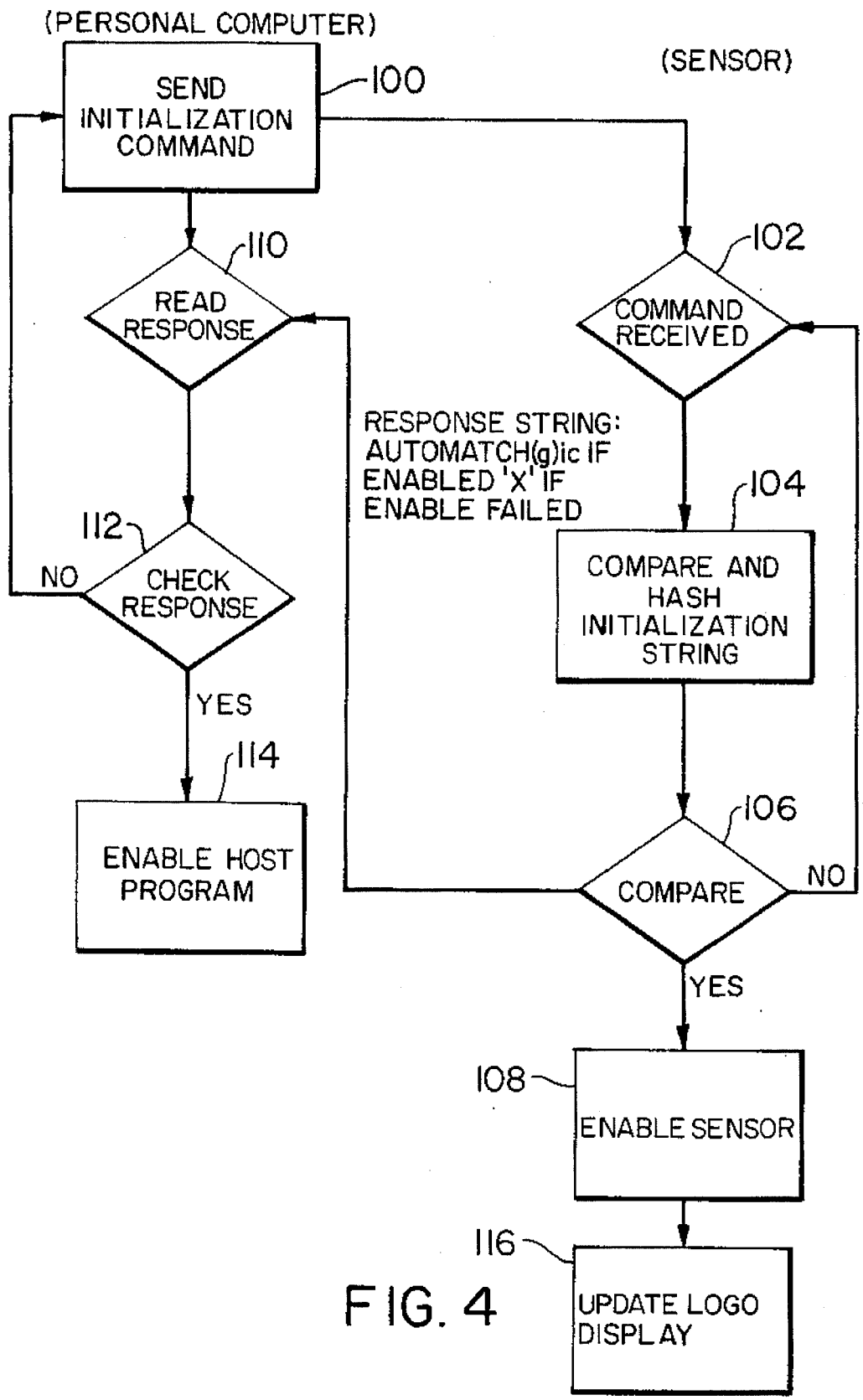
FIG. 4 is a flow chart of the system in accordance with the present invention.

Referring now to FIG. 4, there is illustrated a flow chart setting forth the high level functions of one aspect of the system of the invention which prevents use of unauthorized color formulation software contained in a remote computer and used in combination with the color sensor.

The color formulation software is resident on the personal computer 14. In the flowchart in FIG. 4 the personal computer software is labeled "software" on the left-hand side of the flow chart while the sensor firmware is designated firmware on the right-hand side of the flow chart. As shown in block 100, an initiation string is initially sent to the sensor. The string is received in the sensor at block 102. In block 104 the firmware hashes the initiation string and compares the output of the function with the hash code. If the compared results are not the same in block 106, the compared function begins again or terminates. At this time, the serial port of the sensor is not enabled and prevents communication between the sensor and personal computer. If the hash code and operation of the hash function on the initiation string are the same, serial port is enabled in block 108. Also, the response string is sent stating Automatch(g)ic IF ENABLED; "x" IF ENABLED FAILED. The response is read in block 110. The response is checked in block 112 and if the response is not complete, i.e. what the personal computer software verifies, then the initialization command is sent again. If the response is correct, than the host program on the personal computer is enabled in block 114. Additionally, in block 116, the proprietary information such as the trade logo is transmitted and displayed on the sensor display 21.

The system of the present invention now prevents use of unauthorized color formulation software contained at a remote processing location such as a notebook or personal computer when used with the color sensor such as described in this specification. Thus, the extensive cost and research development that has gone into the development of the sensor and color formulation software is now protected. In addition, other devices having firmware such as sensors or video games which include storage cartridges can be protected.

It is to be understood that the above description is only one preferred embodiment of the invention. Numerous other arrangements may be devised by one skilled in the art without departing from the spirit and scope of the invention.

That which is claimed is:

1. An apparatus for sensing color and having a security system for preventing use of unauthorized color formulation software contained at a remote computer, comprising a sensor body, color sensing means supported by the body for sensing and storing information about the color of a selected object, sensor computing means stored in said sensor body for operating the color sensing means, said sensor computing means including firmware, said firmware having a hash code, and a hash function for operating on an initiation string generated from a remote computer, a communication interface on the sensor body and operatively associated with said sensor computing means and color sensing means, said communication interface allowing connection between said sensor body and a remote computer having color formulations software resident therein, and wherein said sensor computing means includes means for initiating said communication interface upon receipt of initialization command sent by a remote computer having color formulation software resident therein, and allowing transfer of color data from the sensor to a remote computer connected thereto only when a software initiation string as part of the initialization command is received from said remote computer which when operated on by said hash function produces said hash code stored in said firmware.

2. The apparatus according to claim 1 wherein said communication interface comprises an RS 232 serial port.

3. The apparatus according to claim 1 wherein said initiation string comprises proprietary information.

4. The apparatus according to claim 3 wherein said proprietary information comprises a trademark and company name.

5. The apparatus according to claim 1 wherein said color sensing means comprises a spectrophotometer.

6. The apparatus according to claim 1 wherein said sensor computing means includes ROM firmware.

7. The apparatus according to claim 1 wherein said sensor includes a display, and said initiation string is displayed by said sensor display when said communication interface is initiated by the initialization command.

8. A system for preventing use of unauthorized color formulation software contained at a remote computing location which is to be used with a color sensor, comprising a color sensor including a sensor body, color sensing means supported by the body for sensing and storing information about the color of a selected object, sensor computing means stored in the sensor body for operating the color sensing means, said sensor computing means including firmware having a hash code, and a hash function for operating on an initiation string as part of a communication port initialization command, a communication port on the sensor body and operatively associated with said sensor computing and color sensing means, wherein said serial port is enabled and disabled from said sensor computing means based on comparisons of said hash code with the result of an operation of said hash function on an initiation string contained within a serial port initialization command, a remote computer for receiving stored color data from said sensing means, said remote computer including color formulation software resident therein and a communication port and means interconnecting said color sensor and remote computer communication ports to allow color data transfer from said sensor to said remote computer, wherein said remote computer further includes, means for generating an initialization command having an initiation string to said communication port of said color sensor, wherein said sensor computing means compares the result of the hash function operation on said initiation string with said hash code, wherein said communication port is enabled when the result of the hash function operation and hash code are the same to allow data flow from said color sensor to said remote computer and further information processing within said remote computer of color data.

9. The system according to claim 8 wherein said color sensing means comprises a spectrophotometer.

10. The system according to claim 8 wherein said initiation string comprises proprietary information.

11. The system according to claim 10 wherein said proprietary information comprises a trademark and company name.

12. The system according to claim 8 wherein said sensor includes a display, and said initiation string is displayed by said sensor display when said communication port is initiated by said initialization command.

13. The system according to claim 8 wherein said communication ports comprise RS 232 serial ports.

14. A method for sensing color while preventing use of unauthorized color formulation software at a remote computer comprising the steps of sending an initiation string as part of an initialization command from a remote computer to a communication port of a color sensor, performing a hash function on the initiation string, comparing the result of the hash function with a hash code contained within firmware of the color sensor, and a) enabling the communication port for color data transfer from the sensor to the remote computer if the comparison between the hash code and hash function result is the same, and, b) disabling the communication port if the comparison between the hash function result and hash code are not the same.

15. The method according to claim 14 including the step of communication through RS 232 serial ports of the sensor and remote computer.

16. The method according to claim 15 including displaying proprietary information on a display of the sensor after the serial port of the sensor is enabled.

17. The method according to claim 14 including the step of displaying the initiation string on a display of the sensor when the communication port is enabled for further communication.

* * * * *

UNITED STATES PATENT AND TRADEMARK OFFICE
CERTIFICATE OF CORRECTION

PATENT NO. : 5,543,920
DATED : August 6, 1996
INVENTOR(S) : John B. Collins, et al.

It is certified that error appears in the above-indentified patent and that said Letters Patent is hereby corrected as shown below:

At Column 2, line 55, delete the word "tile" and insert the word --the--.

Signed and Sealed this

Fifth Day of November, 1996

Attest:

BRUCE LEHMAN

*Attesting Officer*  *Commissioner of Patents and Trademarks*